April 21, 1970

E. N. ESMAY 3,507,561

INDEXING ROTATABLE NOSEPIECE SUPPORT
FOR MICROSCOPE OBJECTIVES

Filed March 3, 1967

EDWARD N. ESMAY
INVENTOR.

BY *Frank C. Parker*

ATTORNEY

April 21, 1970  E. N. ESMAY  3,507,561
INDEXING ROTATABLE NOSEPIECE SUPPORT
FOR MICROSCOPE OBJECTIVES
Filed March 3, 1967  3 Sheets-Sheet 2

EDWARD N. ESMAY
INVENTOR.

BY *Frank C. Parker*

ATTORNEY

April 21, 1970

E. N. ESMAY 3,507,561

INDEXING ROTATABLE NOSEPIECE SUPPORT
FOR MICROSCOPE OBJECTIVES

Filed March 3, 1967

EDWARD N. ESMAY
INVENTOR.

BY Frank C. Parker

ATTORNEY

United States Patent Office 3,507,561
Patented Apr. 21, 1970

3,507,561
INDEXING ROTATABLE NOSEPIECE SUPPORT FOR MICROSCOPE OBJECTIVES
Edward N. Esmay, Brighton, N.Y., assignor to Bausch & Lomb Incorporated, Rochester, N.Y., a corporation of New York
Filed Mar. 3, 1967, Ser. No. 620,359
Int. Cl. G02b 7/02, 7/16
U.S. Cl. 350—254                             11 Claims

ABSTRACT OF THE DISCLOSURE

A microscope nosepiece support for several objectives in which the indexing detent structure serves as the sole means for simultaneously locating angularly the successive positions of the nosepiece and for optically aligning the several objectives individually with the optical axis of the microscope.

BACKGROUND OF THE INVENTION

This invention relates to a multiple objective microscope nosepiece mounting and more particularly to improvements in the supporting and indexing mechanism therefor.

The chief characteristics sought in a multiple objective microscope nosepiece are, (1) accurate angular and axial positioning of each objective in its operative positions, (2) high repeatability of the objective operative positions within close limits, (3) low operating torque for the revolving nosepiece shell and (4) simplicity of construciton with a correlative low manufacturing cost, and ease of servicing.

In attempting to build these characteristics into a microscope, designers were confronted with the vexing problem of true accurate alignment in laterally centering the apertures of the objective carrying nosepiece shell with the axis of the microscope tube. In addition, the problem of longitudinally coaxially aligning the optical axis of each objective successively with the optical axis of the microscope tube was ever present.

Microscope nosepiece mountings in the past have generally been one of two types of construction. The first is generally known as a "conventional" construction and is best understood by referring to U.S. Patent No. 2,656,759, issued to C. J. Bowerman on Oct. 27, 1953. In this construction, an antifrictional thrust bearing, preferably of the ball bearing type, is provided between the stationary and rotatable members at their peripheral portions. The detent action is provided by a flat spring blade acting on a rounded contact button.

Similarily the second construction, commonly known as an "upside down" construction and shown in U.S. Patent No. 2,621,563 issued to B. W. Jones on Dec. 16, 1952 utilizes the ball bearing construction between rotatable and stationary members with the detent action provided by a detent button and a flat spring.

Inherent difficulty with both the conventional and the upside down construction was found in the ball bearing construction whenever the nosepiece was accidently bumped by the user or was subjected to hard and abusive treatment. The ball bearings, having a point contact on their ball race surfaces, would peen the soft races under such treatment. After continuous hard usage, the peened ball races produced misalignment between the objectives and the optical axis of the microscope.

SUMMARY OF THE INVENTION

The present invention incorporates a plurality of roller shaped detent members situated equi-angularly around an annular surface. Facing this surface is a similar annular surface containing an equal number of equally spaced surface interruptions forming detent receiving notches, said notches serving to receive the detent members.

The roller shaped detent members do not roll, as the name implies, but are used as contact members to slide on the confronting (facing) annular surface, and function to locate each of the several objectives individually and successively with the optical axis of the microscope. The use of such detent members, serves as the sole means for simultaneously indexing the microscope nosepiece and for aligning the objectives optically. In addition, the use of roller shaped detent members, having a line contact, serves to minimize any peening action due to misuse and abusive treatment as before mentioned.

In view of the above summary it is an object of this invention to provide a novel microscope nosepiece of the above mentioned type having means for rotatably supporting an objective carrying shell on the microscope tube substantially without shake or undesirable looseness.

A further object is to provide such a device which is composed of a small number of parts of simple form which is easy to use, assemble and service and which remains permanently adjusted.

Another object is to provide a novel microscope nosepiece of the above mentioned types having novel means which the detent construction is the sole means for for rotatably supporting an objective carrying shell in indexing the nosepiece and aligning the objectives with the optical axis of the microscope.

A further object is to provide such a device in which the objective carrying shell and microscope tube are constructed with means for yieldably urging the detent members toward the detent notches to effect the required detent action.

A still further object is to provide a nosepiece structure for microscopes embodying a structure wherein the detent members are formed as separate elements which are fixedly assembled in their receiving notches.

Still another object is to provide in the so-called "upside down" type of microscope nosepiece support construction a structure wherein the detent members are formed as a part of the dependent structure in order to raise the nosepiece shell from the specimen being observed during indexing.

A further object is to provide a nosepiece structure wherein the means for indexing the objectives and aligning the same is accomplished by the use of at least three equally spaced detents.

Further objects and advantages will be found in the novel details of construction, combinations and arrangement of the parts of this invention by referring to the specification herebelow and the accompanying drawings.

DESCRIPTION OF PREFERRED EMBODIMENT

Figure 1:
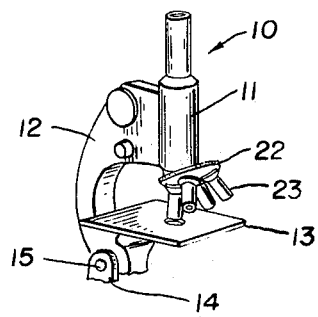
FIGURE 1 is a general perspective view of the upper part of a microscope showing a nosepiece which incorporates the invention.

A microscope, embodying my invention, is shown generally by numeral 10 in FIGURE 1 of the drawings and comprises a body tube 11 mounted on an arm 12 to which a stage 13 is fixed in any desired manner. The arm 12 is formed on a base 14 (fragmentarily shown) by an inclination joint 15 so as to support the arm 12 and body tube 11. Formed in the lower portion of the tube 11 is a cross wall 16 in which a bore 17 is located substantially concentrically with the optical axis 18 of the microscope wherein an auxiliary or relay lens cell 19 may be held, if desired.

Also formed on the cross wall 16, in the center thereof, is a boss 20 drilled and tapped to receive a headed pivot stud 21, said stud serving as a pivot around which a circular nosepiece shell 22 rotates.

NOSEPIECE CONSTRUCTION

The nosepiece shell 22, of convex-concave construction, carries a plurality of objective lenses 23 of different powers which may be selectively moved into operating position beneath the tube 11 as described hereinafter.

Formed in the center of the nosepiece shell 22 is a boss 24 which contains a bore 25 and a counter bore 26, both formed in the convex or outer face of the nosepiece shell 22. In addition, the bore 25 is drilled through at the bottom thereof, with a hole 27 of slightly larger diameter than the shank of the headed pivot stud 21 in order to allow the headed pivot stud 21 to pass through without interference. Housed in the bore 25 is a compression spring 28 seated at one end in the bottom of the counterbore and at the other end thereof under the head of the pivot stud 21. It should be noted that the headed pivot stud 21 and the spring 28 function only to yieldably urge the nosepiece shell 22 toward the body tube 11 in order to secure the detent action, hereinafter described, and not to align the objective lenses 23 with the optical axis 18 of the microscope 10. In fact when the nosepiece shell 22 is assembled onto the tube 11 by means of the headed pivot stud 21 and during rotation of the shell the surface 29 of the tube boss 20 does not contact the surface 30 of the nosepiece shell boss 24.

Figure 4:
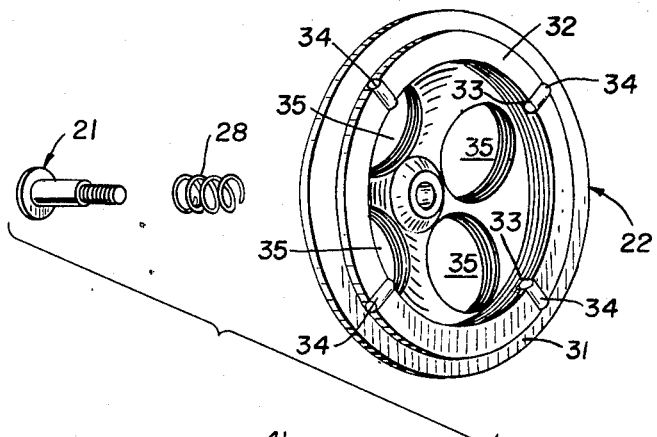
FIGURE 4 is a perspective view of certain mechanical parts including the rotatable nosepiece shell shown in FIGURE 2, FIGURES 5, 6 and 7 are enlarged sectional views showing different types of detent structure.

Referring now to FIGURE 4 there is formed on the peripheral portion of the nosepiece shell 22, on the concave or inner side thereof, a radial flange 31 on which is formed a radial flat annular surface 32. This surface contains a plurality of detent pockets 33, each pocket containing a detent member 34 located equiangularly around the annular surface 32 so as to be equal in number and spacing with the number of objective lenses 23 in the microscope 10. In the embodiment in FIGURE 4 there are shown four objective lens openings 35 and accordingly there are four detent pockets 33, each pocket containing a similar detent member 34 and located equiangularly around the annular surface 32. Similarly if the nosepiece shell 22 contained three objective lens openings 35 in order to carry three objective lenses 23, the annular surface 32 would contain three detent pockets 33 each carrying similar detent members 34 and spaced equiangularly around the annular surface 32.

It should be noted at this point that it is essential in practicing this invention that at least three detent members 34, wih their respective detent notches 41, be utilized thereby defining a plane surface which is necessary in order to achieve the high degree of alignment necessary in the microscope art.

Figure 5:
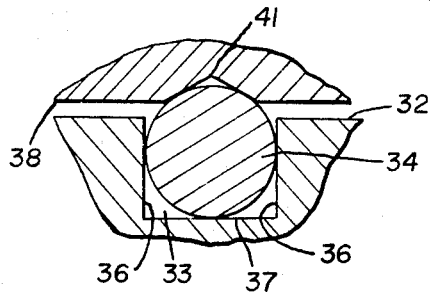

The detent pockets 33 are formed with two opposed flat and mutually parallel surfaces 36 and a bottom surface 37 best shown in FIGURE 5. In the preferred form shown, the dimension between the parallel surfaces 36 is slightly less than the diameter of the detent member 34 which requires a press fit to assemble and results in the detent member 34 being confined non-rotatably in the detent pocket 33. In addition all of the bottom surfaces 37 of the detent pockets 33 are formed coplanar resulting in the bearing surface of the detent members 34 being coplanar since they are all similar in shape and size.

The detent members 34, being bearing members, are formed preferably from a hardened drill rod, cut to the proper size thereby forming the cylindrical shaped detent members shown in FIGURE 4. As a variation the detent members could be formed in the shape shown in FIGURE 6 which would be equally effective. A further modification would be to form the detent member integral with the annular surface 32, such as by casting them on the annular surface 32, which is not shown in the drawings. However, it should be noted that the shape of the detent member 34 is not important as long as all of the detent members are similar in size and when formed on or contained in the annular surface 32 they are coplanar and equiangularly spaced around the annular surface 32 in a fixed relationship to each other and to the objective lenses 23.

TUBE CONSTRUCTION

Figure 2:
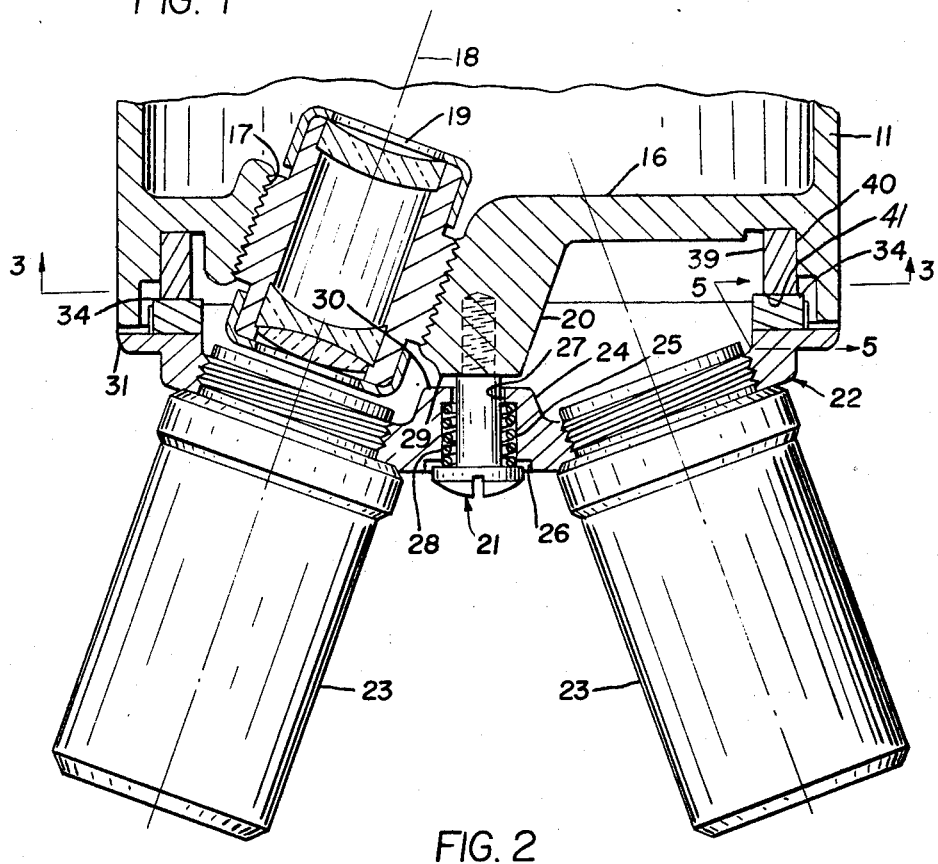
FIGURE 2 is an enlarged side view partly in section of one form of the invention.

Turning now to the tube 11 and referring specifically to FIGURE 2, there is formed on the lower portion of the tube 11 a radial flat annular surface 38 mutually spaced apart from the annular surface 32 on the nosepiece shell 22. In the embodiment shown in FIGURE 2 the annular surface 38 is formed on a separate ring-like structure 39 fixedly held by any well known means in a bore 40, said bore being drilled, cast or formed by other means in the lower end of tube 11. However there is nothing to preclude the annular surface 38 from being formed integrally in the crosswall 16 as a protuberance thereby eliminating the separate ring-like structure 39.

Figure 3:
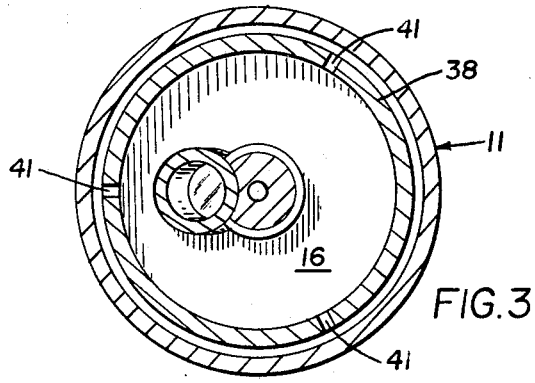
FIGURE 3 is a sectional view taken on the line 3—3 of FIGURE 2.
Figure 6:
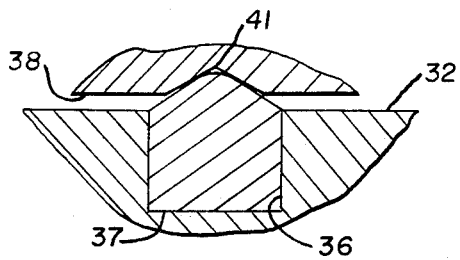

The annular surface 38 contains a plurality of duplicate equiangularly spaced surface interruptions forming detent receiving notches, shown generally in FIGURES 3, 5 and 6 as numeral 41, the number of detent notches 41 equaling the number of detent members 34 and having a fixed relationship with the optical axis 18 such that the objective lens openings 35 are aligned with the optical axis 18 when the detent members 34 are in the detent notches 41.

The detent notches 41, pictured in the various figures of the drawings, are shown as incline sided V-shaped notches for illustrative purposes only. However this does not preclude the use of other constructions equally effective to give the surface interruption necessary for the required detent action.

Examples of other constructions possible are rectangular notches with straight or chamfered corners, round notches and many other varieties, all of which allow the necessary detent action to occur.

FIGURE 3, a sectional view taken on lines 3—3 of FIGURE 2, shows a modification of the invention wherein three objectives are used, thereby, as before explained, resulting in three detent members 34 and detent notches 41.

Figure 7:
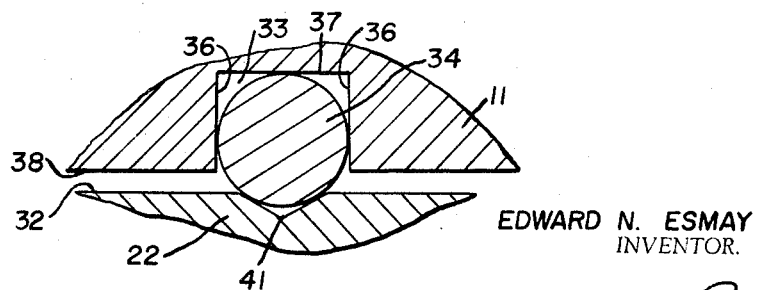

From the foregoing it becomes apparent that the detent pockets 33 and members 34 may be reversed or interchanged with the detent notches 41 without affecting the operation of the nosepiece shell 22. This modification is shown in FIGURE 7, wherein the detent pocket 33, with detent member 34 retained therein, is contained in the annular surface 38 on the microscope tube 11 instead of being contained in the annular surface 32 on the nosepiece shell 22 as shown in FIGURES 2, 4, 5 and 6. With this modification the detent notch 41 would then be contained in the annular surface 32 on the nosepiece shell 22 instead of being contained in the annular surface 38 on the microscope tube 11 as shown in the same drawings.

UPSIDE DOWN CONSTRUCTION

Figure 8:
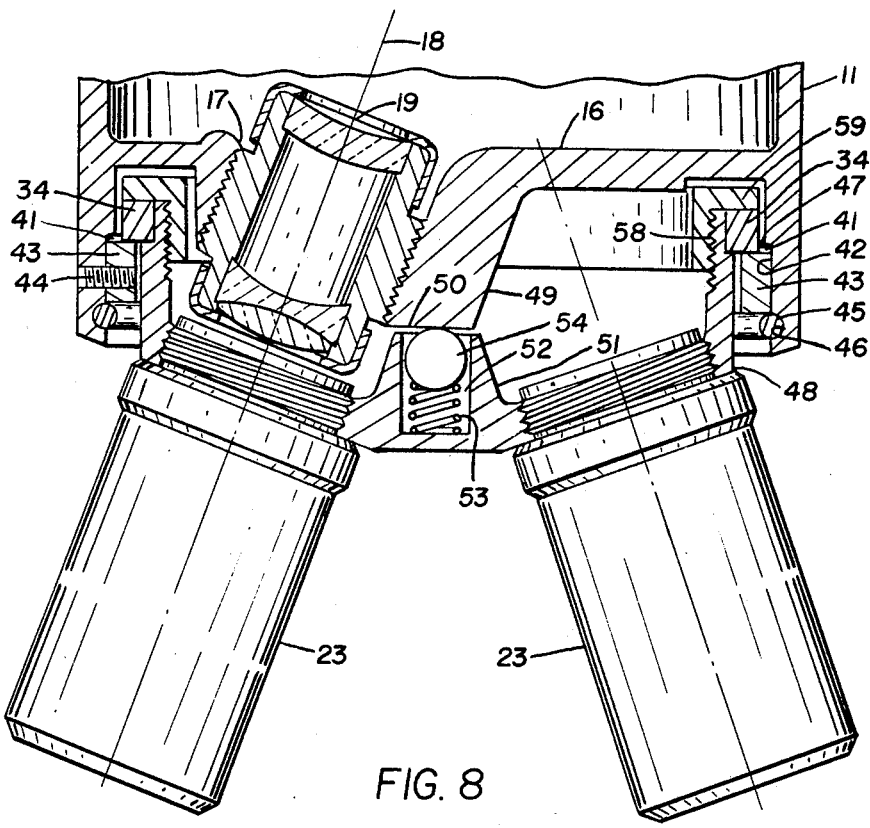
FIGURE 8 is an enlarged side view of the "upside down" construction, partially shown in section and broken away.

Turning now to FIGURE 8, there is shown a form of my invention adapted to the "upside down" construction before mentioned. In this embodiment, a bore 42 is formed on the lower end of the body tube 11, said bore acting to receive a support ring 43. The support ring 43 has formed thereon a flat annular surface 47 containing thereon a plurality of duplicate equiangularly spaced detent notches 41 similar to those shown in FIGURES 5, 6 and 7, the number of detent notches 41 equaling the number of detent members 34 and the dtent members and the detent notches having the same fixed relationships to the objective lens openings 35 and the optical axis 18, respectively, as do the detent members and the detent notches in the "conventional" construction.

The support ring 43 is non-rotatably confined in the bore 42 by means of a set screw 44 fastened in a drilled and tapped hole through the lower end of the body tube 11. A snap ring 45, contained in a ring groove 46, cut in the lower end of the body tube 11, retains the support ring 43 in the bore 42.

Formed in the lower portion of the tube 11 is a cross wall 16 which contains a boss 49 near the center thereof, said boss serving as a contact surface 50 whereby the detent action is obtained as hereinafter mentioned.

NOSEPIECE CONSTRUCTION

The nosepiece shell 48, of the convex-concave construction, carries a plurality of objective lenses 23 of different powers which may be selectively moved into operating position beneath the tube 11 as described hereinafter.

Formed in the center of the nosepiece shell 48 is a boss 51 which contains a bore 52 drilled into the concave or inner face of the nosepiece shell 48. Housed in the bore 52 is a compression spring 53 seated at one end on the bottom surface of the bore 52 and at the other end thereof against a ball 54. It should be noted at this point that the detent action is obtained by means of the ball 54 in contact with the surface 50 on the tube boss 49 whereby the compression spring 53 yieldably urges the nosepiece shell 48 toward the support ring 43.

Figure 9:
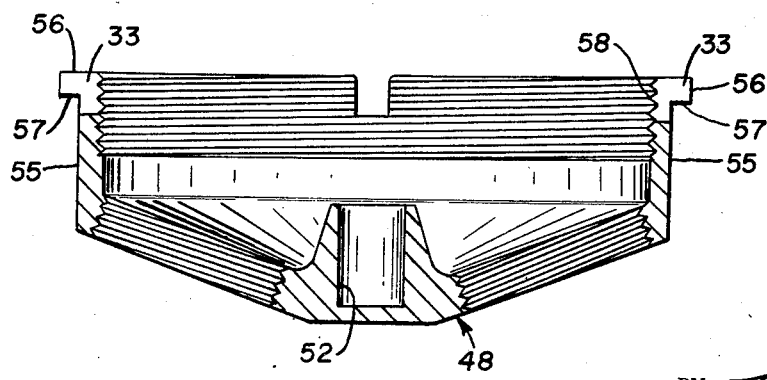
FIGURE 9 is a midsectional view of the nosepiece shell in the mechanism shown in FIGURE 8.

Referring now generally to FIGURE 8 and specifically to FIGURE 9, there is formed on the upper wall 55 of the nose piece shell 48 a radial flange 56 having formed thereon a substantially radial flat annular surface 57. The flange contains a plurality of detent pockets 33, each pocket containing a detent member 34 located in the same fixed relationship as before mentioned with the "conventional" construction. The detent members 34 and detent pockets 33 are constructed in a manner similar to that shown in FIGURES 5, 6 and as before described.

Formed on the inner side of the upper wall 55 is a thread 58 which is used to fasten a retainer 59 to the nosepiece shell 48. The retainer 59 serves to prevent the detent members 34 from being forced from their detent pockets 33 during continued operation of the nosepiece shell 48.

From the foregoing it can be seen that the positions of the detent members 34 may be reversed with the positions of the detent notches in the same manner as the "conventional" construction without affecting the spirit of the invention.

OPERATION

During operation of the "conventional" construction, shown in FIGURE 2, the operator, desiring to change the objective lens 23 to one of a different power, simply grasps the nosepiece shell 22 with his hand and rotates it about the axis of the headed pivot stud 21. This causes the detent members 34 contained in the nosepiece shell 22 to be forced downwardly out of their respective detent notches 41 and slide over the annular surface 38 formed on the ring like structure 39, which is formed on or contained in the tube body 11. When the next objective lens 23 is in the properly aligned operative position, the action of the spring 28 will seat the detent members 34 in their respective detent notches. From this it can readily be seen that by the use of the detent member 34 seating in the detent notches 41 around the annular surface, a positive alignment of the objective lens 23 can be obtained with a high degree of repeatability.

The operation of the "upside down" construction shown in FIGURE 8 is similar to that of the "conventional" construction, with the exception that the detent member 34 is forced upwardly out of its detent notch 41 due to the "upside down" construction of the structure. This action prevents the high powered objectives from colliding with the specimen slide on the cover slip. When the next objective lens 23 is in the proper position, the spring 53 acts to seat the detent members 34 in their respective detent notches 41.

It will be seen from the above described structure that I have provided a nosepiece construction consisting of detent members and detent notches situated around confronting annular surfaces which cooperate with each other to eliminate from the movement of the nosepiece substantially all unwanted lost motion which contributes to the lack of coaxiality of axial alignment of the objectives with the optical axis of the microscope in their operative positions.

Although only certain forms of the present invention are shown and described herein in detail, other forms are possible and changes may be made in the arrangements and combinations of the parts and in the detailed structures without departing from the spirit and scope of the invention.

I claim:

1. A microscope nosepiece mechanism for rotatably supporting a nosepiece shell on which a group of different powered objectives are secured on a microscope tube so as to be selectively aligned with the optical axis of the microscope, said mechanism including the combination of
    means for rotatably securing the nosepiece shell to the microscope tube,
    means forming a first substantially planar annular contact surface on said nosepiece shell, concentric with and normal to its axis of rotation,
    means forming a second substantially planar annular contact surface which is carried by said tube in a fixed position which is confronting and spaced parallel from said first annular surface,
    a plurality of at least three duplicate equiangularly spaced surface interruptions forming detent receiving notches in one of said annular surfaces,
    third means forming a like number of duplicate equiangularly spaced protruding detents on the other of said annular surfaces, and
    means for yieldably biasing the annular surfaces toward each other whereby said detents acting together with said notches constitute the sole means for simultaneously indexing the nosepiece shell and for aligning the objectives with the optical axis of the microscope.

2. A rotatable nosepiece mechanism for interchangeably supporting a group of different powered objectives on a microscope tube so as to be selectively aligned with the optical axis of the microscope, said mechanism comprising
    a circular nosepiece shell in which said objectives are mounted around the central axis thereof,
    means for rotatably securing the nosepiece shell to the microscope tube,
    a radial flange formed on the peripheral portion of said shell,
    a substantially radial flat annular contact surface formed on said flange,
    a substantially radial flat annular contact surface formed on the lower portion of said tube, said annular surface being mutually spaced apart from the annular surface on said flange and in confronting relationship thereto, means forming at least three duplicate equally spaced surface interruptions forming detent receiving notches in one of said annular surfaces, the number of notches matching the number of said objectives and having a fixed angular relation thereto, a plurality of duplicate detent members formed on the surface of the other one of said annular surfaces which engage said detent notches, said detent members being of the same number and angular spacing as said detent notches so as to engage simultaneously upon rotation of said nosepiece shell, and means for yieldably urging said annular surfaces toward each other to rest said detents in said detent notches with a prescribed force.

3. A rotatable nosepiece mechanism for interchangeably supporting a group of different powered objectives on a microscope tube so as to be selectively aligned with the optical axis of the microscope, said mechanism comprising a circular nosepiece shell in which said objectives are mounted around the central axis thereof, a radial flange formed on the peripheral portion of said shell, a substantially radial flat annular contact surface formed on said flange, a substantially radial flat annular contact surface formed on the lower portion of said tube opposite to and above said flange, said annular surface being mutually spaced apart from the annular surface on said flange, means forming at least three duplicate equally spaced surface interruptions forming detent receiving notches in one of said annular surfaces, the number of notches matching the number of said objectives and having a fixed angular relationship thereto, a plurality of duplicate detent members fixed in the other of said annular surfaces which engage said detent notches, said detent members being of the same number and angular spacing as said detent notches so as to engage simultaneously upon rotation of said nosepiece shell, a headed pivot stud on which said shell is rotatably concentrically mounted, said stud being anchored in a crosswall of the microscope tube, and a spring seated under spring stress at one end beneath the head of the stud and at the other end against said shell for yieldably urging said flange toward said ring like surface formed on the lower portion of said tube so as to seat said detent members in said detent notches.

4. A rotatable nosepiece mechanism for interchangeably supporting a group of different powered objectives on a microscope tube so as to be selectively aligned with the optical axis of the microscope, said mechanism comprising a circular nosepiece shell in which said objectives are mounted around the central axis thereof, a radial flange formed on the peripheral portion of said shell, a substantially radial flat annular contact surface formed on said flange, a substantially radial flat annular contact surface formed on the lower portion of said tube opposite to and below said flange, said annular surface being mutually spaced apart from the annular surface on said flange, means forming at least three duplicate equally spaced surface interruptions forming detent receiving notches in one of said annular surfaces, the number of notches matching the number of said objectives and having a fixed angular relationship thereto, a plurality of duplicate detent members fixed in the other of said annular surfaces which engage said detent notches, said detent members being of the same number and angular spacing as said detent notches so as to engage simultaneously upon rotation of said nosepiece shell, and a spring seated under spring stress at one end against the central part of the inner surface of said shell and at the other end against a crosswall in said microscope tube so that said detent members are yieldably urged into engagement with their respective notches.

5. A rotatable nosepiece mechanism as set forth in claim 2 further characterized by said notches being accurately located angularly at 90° from each other and said detent members being similarly located whereby the following conditions are obtained,
(a) the centration of the radial annular surfaces to each other is reliably established,
(b) the colinearity of the optical axis of the microscope and the optical axis of said objectives is reliably established for each change of objectives,
(c) balanced detent action around the annular support for the objectives and
(d) a repeatable precision actuation of each objective is secured.

6. A rotatable nosepiece mechanism according to claim 3 wherein said detent receiving notches are located in the flat annular contact surface formed on the lower portion of said tube, and said flat annular contact surface formed on said flange includes a like plurality of detent pockets in which said detent members are firmly held.

7. A rotatable nosepiece mechanism according to claim 6 wherein said detent notches are radially extended V-shaped indentations in said annular contact surface, said detent members are cylindrical, and said detent pockets are radially extended U-shaped channels in which said cylindrical detent members are fixedly held, the channel being shaped so that a radially extended cylindrical segment protrudes from the annular surface to engage said detent notches.

8. A rotatable nosepiece mechanism according to claim 4 wherein said detent receiving notches are located in the flat annular contact surface formed on the lower portion of said tube, and said flat annular contact surface formed on said flange includes a like plurality of detent pockets in which said detent members are firmly held.

9. A rotatable nosepiece mechanism according to claim 8 wherein said detent notches are radially extended V-shaped indentations in said annular contact surface, said detent members are cylindrical, and said detent pockets are radially extended U-shaped channels in which said cylindrical detent members are fixedly held, the channel being shaped so that a radially extended cylindrical segment protrudes from the annular surface to engage said detent notches.

10. A microscope nosepiece mechanism for rotatably supporting a nosepiece shell on which a group of different powered objectives are secured on a microscope tube so as to be selectively aligned with the optical axis of the mircoscope, the mechanism comprising in combination means for rotatably securing the nosepiece shell to the microscope tube, a first substantially planar annular contact surface formed on the nosepiece shell, concentric with and normal to its axis of rotation, a second substantially planar annular contact surface fixedly formed on the microscope tube, the second surface confronting, being concentric with, being spaced from, and being parallel to the first surface, a plurality of at least three duplicate equiangularly spaced radially extended surface interruptions forming detent receiving notches in one of the surfaces, a like plurality of duplicate, equiangularly spaced, radially extended protruding detents on the other annular surface, means for yieldably biasing the annular surfaces toward each other whereby said detents acting together with the notches constitute the sole means for simultaneously indexing the nosepiece shell and for aligning the objectives with the optical axis of the microscope.

11. A microscope nosepiece mechanism according to claim 10 in which said detent notches are radially extended V-shaped indentations in said annular surface, and said detents are radially extended cylindrical segments.

References Cited

UNITED STATES PATENTS

| 3,287,513 | 11/1966 | McFarland | 74—527 |
| 1,815,866 | 7/1931 | Reese | 351—12 |
| 2,621,563 | 12/1952 | Jones | 350—254 |
| 2,656,759 | 10/1953 | Bowerman | 350—254 |

DAVID SCHONBERG, Primary Examiner

R. L. SHERMAN, Assistant Examiner

U.S. Cl. X.R.

350—39

PO-1050
(5/69)

UNITED STATES PATENT OFFICE
CERTIFICATE OF CORRECTION

Patent No. 3,507,561      Dated April 21, 1970

Inventor(s) Edward N. Esmay

It is certified that error appears in the above-identified patent and that said Letters Patent are hereby corrected as shown below:

Col.2, between lines 27-28, insert
"for rotatably supporting an objective carrying shell in"

line 29, delete "for"

SIGNED AND
SEALED

OCT 27 1970

(SEAL)
Attest:

Edward M. Fletcher, Jr.
Attesting Officer

WILLIAM E. SCHUYLER, JR.
Commissioner of Patents